(12) United States Patent
Han

(10) Patent No.: US 10,502,127 B2
(45) Date of Patent: Dec. 10, 2019

(54) ROTARY ENGINE

(71) Applicant: Zhaoyan Han, Shandong (CN)

(72) Inventor: Zhaoyan Han, Shandong (CN)

( * ) Notice: Subject to any disclaimer, the term of this patent is extended or adjusted under 35 U.S.C. 154(b) by 29 days.

(21) Appl. No.: 16/026,098

(22) Filed: Jul. 3, 2018

(65) Prior Publication Data

US 2018/0313262 A1 Nov. 1, 2018

Related U.S. Application Data

(63) Continuation-in-part of application No. PCT/CN2016/000647, filed on Nov. 22, 2016.

(30) Foreign Application Priority Data

Jan. 4, 2016 (CN) .......................... 2016 1 0001865

(51) Int. Cl.
| | |
|---|---|
| *F02B 53/14* | (2006.01) |
| *F01C 1/077* | (2006.01) |
| *F02B 55/02* | (2006.01) |
| *F02B 55/14* | (2006.01) |
| *F16H 48/08* | (2006.01) |

(52) U.S. Cl.
CPC .............. *F02B 53/14* (2013.01); *F01C 1/077* (2013.01); *F02B 55/02* (2013.01); *F02B 55/14* (2013.01); *F16H 48/08* (2013.01); *Y02T 10/17* (2013.01)

(58) Field of Classification Search
CPC .......... F02B 53/14; F02B 55/02; F02B 55/14; F16H 48/08
See application file for complete search history.

(56) References Cited

U.S. PATENT DOCUMENTS

| | | | | |
|---|---|---|---|---|
| 3,438,358 A | * | 4/1969 | Porsch ...................... | F01C 1/44 123/241 |
| 3,795,226 A | * | 3/1974 | Bodine ................... | F02B 53/00 123/242 |
| 3,970,049 A | * | 7/1976 | Yamaguchi ............. | F02B 53/12 123/211 |

(Continued)

FOREIGN PATENT DOCUMENTS

| | | |
|---|---|---|
| CN | 2095942 U | 2/1992 |
| CN | 1975126 A | 6/2007 |

(Continued)

*Primary Examiner* — Patrick D Maines
(74) *Attorney, Agent, or Firm* — Wayne & Ken, LLC; Tony Hom

(57) ABSTRACT

The present disclosure relates to a rotary engine which includes a cylinder having a gas inlet and a gas outlet, two rotors which are mounted inside the cylinder and can rotate freely, pistons fixed on the rotors, an ignition device provided on an inner wall of the cylinder and a planetary conical gear differential located outside the cylinder. The planetary conical gear differential includes a first sun gear and a second sun gear. The first rotor and the second rotor are superposed concentrically, the first rotor is connected to the first sun gear through a spindle, and the first rotor and the second rotor are connected to the planetary conical gear differential on a same side of the planetary conical gear differential. The cylinder is a circular ring body. The pistons are in circular motion along with the rotors. A differential rotary engine capable of rotating normally is provided.

1 Claim, 3 Drawing Sheets

(56) References Cited

U.S. PATENT DOCUMENTS

| | | | | |
|---|---|---|---|---|
| 4,579,019 A | * | 4/1986 | Gabriele | F16H 3/66 |
| | | | | 475/47 |
| 5,433,179 A | * | 7/1995 | Witty | F01C 1/07 |
| | | | | 123/202 |
| 6,899,075 B2 | | 5/2005 | Saint-Hilaire et al. | |
| 2003/0200951 A1 | * | 10/2003 | Morgado | F01C 1/07 |
| | | | | 123/245 |
| 2007/0068481 A1 | * | 3/2007 | Campbell | F01C 1/36 |
| | | | | 123/246 |

FOREIGN PATENT DOCUMENTS

| | | | |
|---|---|---|---|
| CN | 101014758 | A | 8/2007 |
| CN | 101852121 | A | 10/2010 |
| CN | 101963093 | A | 2/2011 |
| CN | 203499815 | U | 3/2014 |
| CN | 104279054 | A | 1/2015 |
| CN | 104314673 | A | 1/2015 |
| CN | 104421382 | A | 3/2015 |
| CN | 204344266 | U | 5/2015 |
| FR | 4778 | E | 10/1905 |
| FR | 457151 | A | 9/1913 |

\* cited by examiner

ROTARY ENGINE

TECHNICAL FIELD

The present disclosure relates to a rotary engine, particularly to a differential rotary engine.

BACKGROUND

Currently, for differential rotary engines among well-known rotary engines, a combustion chamber is located between two pistons which use the combustion chamber in common. Explosion of a combustion gas generates thrusts with a same magnitude and opposite directions for two rotors, then the differential rotary engines cannot rotate normally.

OBJECT OF THE DISCLOSURE

An object of the present disclosure is to provide a differential rotary engine capable of rotating normally.

SUMMARY

The object of the present disclosure is realized as follows: two rotors are enclosed in a cylinder, pistons on the two rotors are each provided with an independent combustion chamber, an opening of the combustion chamber faces a cylinder wall, a compressed gas is stored in the independent combustion chamber of the piston on the rotor, after the compressed gas is ignited, firstly, a strong thrust of this piston generates a relatively small thrust to the other piston, thus creating a differential force source. The other two pistons complete air intake simultaneously. Thus, under the driving of the pistons, the rotors operate in a single direction. The two rotors are connected to a planetary conical gear differential on a same side of the planetary conical gear differential.

BRIEF DESCRIPTION OF THE DRAWINGS

The present disclosure is further described in conjunction with drawings below.

In the figures, 1 represents a cylinder, 11 represents a gas inlet, 12 represents a gas outlet, 2 represents a rotor, 201 represents a first rotor, 202 represents a second rotor, 3 represents an ignition device, 4 represents a spindle, 5 represents a hollow shaft, 6 represents a planetary conical gear differential, 7 represents a first sun gear, 8 represents a second sun gear, 9 represents a piston, 901 represents a first piston, 902 represents a second piston, 903 represents a third piston, 904 represents a fourth piston, 10 represents an independent combustion chamber, 101 represents a first piston wall, and 102 represents a second piston wall.

DETAILED DESCRIPTION

Figure 1:
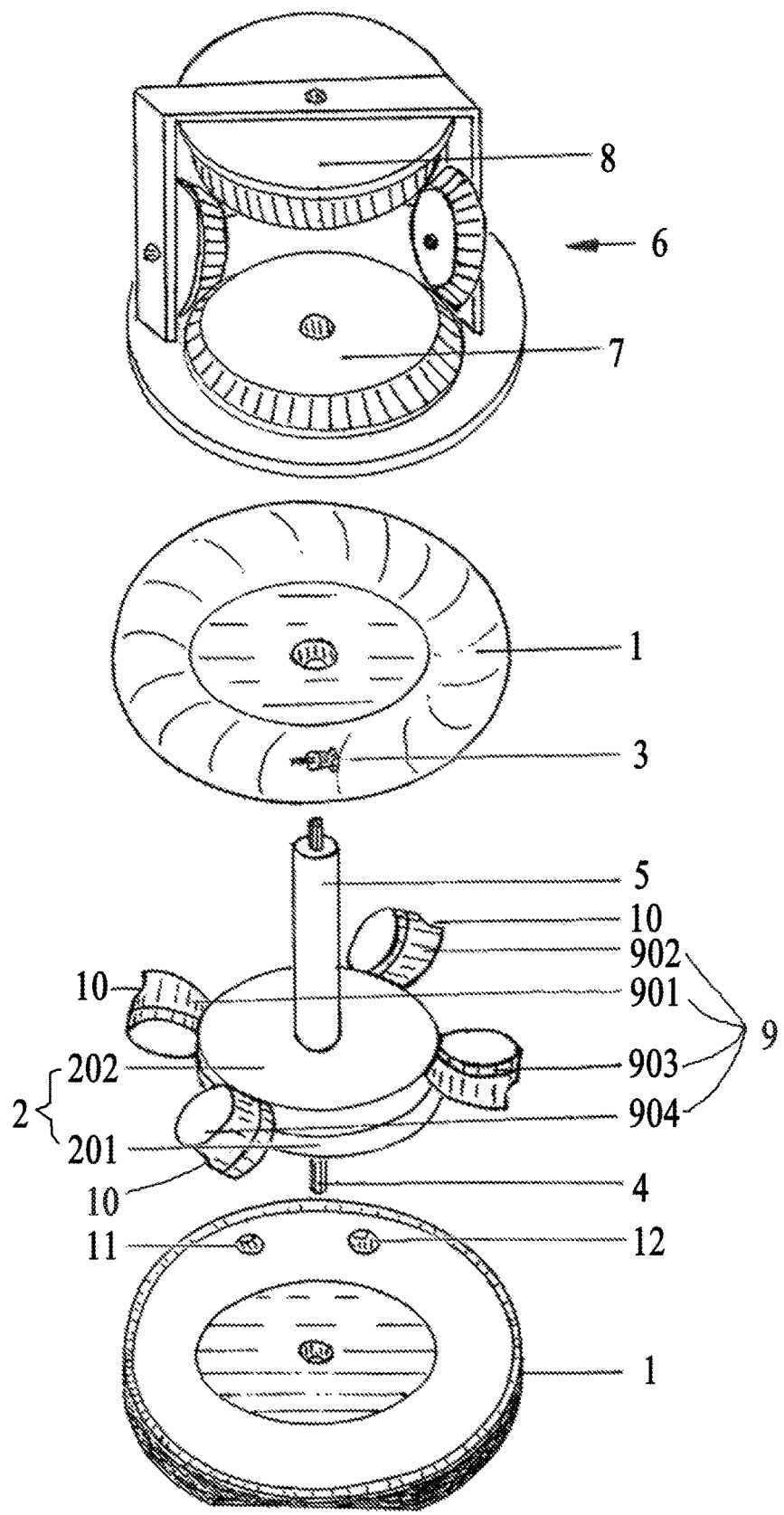
FIG. 1 is a schematic diagram of configuration of the present disclosure.
Figure 2:
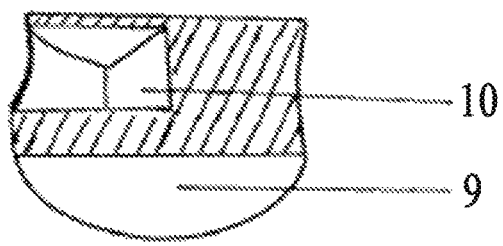
FIG. 2 is a sectional schematic diagram of a piston of the present disclosure.
Figure 3:
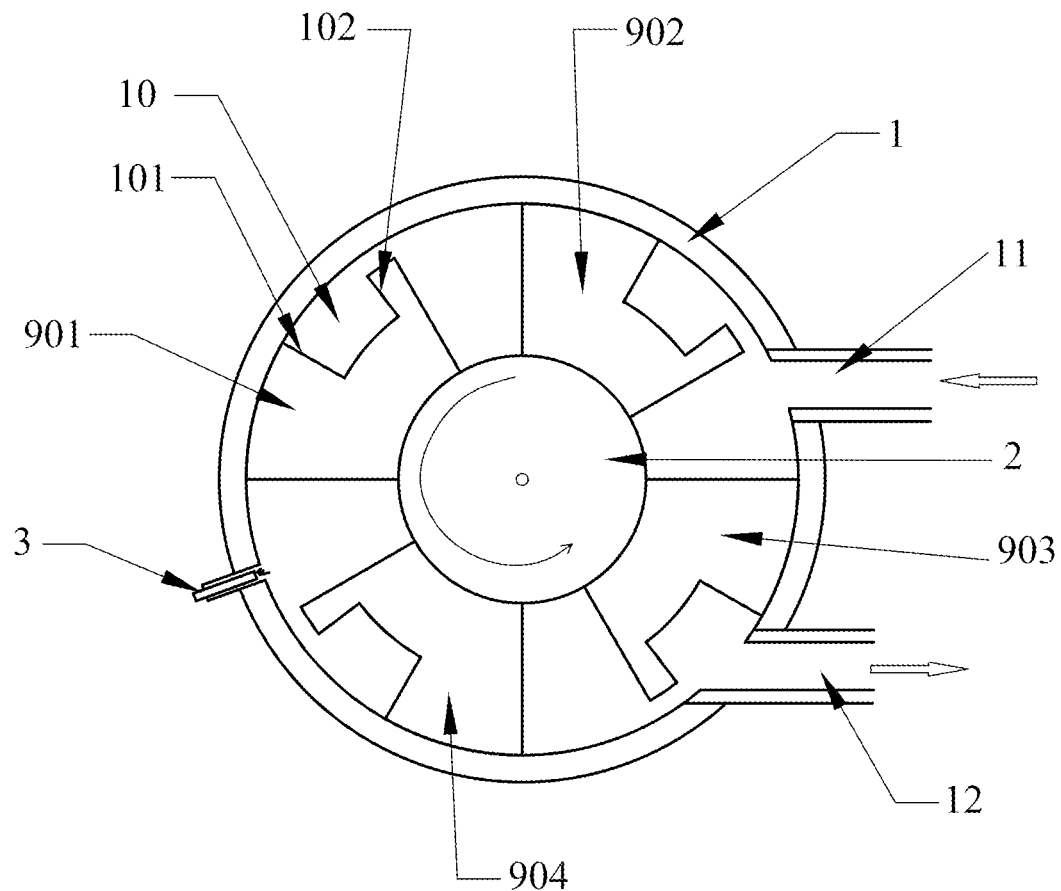
FIG. 3 is a cross-section schematic diagram of a cylinder of the present disclosure.

As shown in FIG. 1 to FIG. 3, a rotor engine includes: a cylinder 1 having a gas inlet 11 and a gas outlet 12;

two rotors 2 which are mounted inside the cylinder 1 and can rotate freely, wherein the rotors include a first rotor 201 and a second rotor 202;

pistons 9 fixed on the rotors 2, wherein at least one pair of pistons are fixed to the first rotor 201, and at least one pair of pistons 9 are fixed to the second rotor; the pistons 9 includes a first piston 901, a second piston 902, a third piston 903 and a fourth piston 904.

an ignition device 3 provided on an inner wall of the cylinder 1;

a planetary conical gear differential 6 located outside the cylinder 1, wherein the planetary conical gear differential includes a first sun gear 7 and a second sun gear 8.

The first rotor 201 and the second rotor 202 are superposed concentrically. The first rotor 201 is connected to the first sun gear 7 through a spindle 4, the second rotor 202 is connected to the second sun gear 8 through a hollow shaft 5, and the spindle 4 passes through the hollow shaft 5. The pistons 9 are each provided with an independent combustion chamber 10, and an opening of the independent combustion chamber 10 faces the inner wall of the cylinder 1.

In a preferred embodiment, the cylinder 1 is a circular ring body.

The pistons 9 are in circular motion along with the rotors 2. The independent combustion chambers 10 are in seamless contact with the inner wall of the cylinder 1 at a first piston walls 101 thereof in the front along a rotating direction, and a gap is provided between the combustion chambers 10 and the inner wall of the cylinder 1 at a second piston wall 102 thereof in the rear along the rotating direction.

A basic operation principle is as follows: one of the pistons 9 rotates along the anticlockwise direction, and when passing through the gas inlet 11, the combustion chamber 10 is filled up with a high-pressure combustion gas. The piston 9 rotates to a position of the ignition device 3, to ignite the high-pressure combustion gas, the combusted gas expands and works on the piston 9, to drive the piston to continue rotating in an original direction, then the piston 9 rotates to a position of the gas outlet 12 to exhaust, and the piston 9 subsequently rotates to the gas inlet 11 to perform a next circulation. A first piston 901, a second piston 902, a third piston 903 and a fourth piston 904 perform a process of intake, ignition, working and exhaust in turn. In a preferred embodiment, the pistons on the first rotor 101 and the pistons on the second rotor 102 are provided to work alternately.

What is claimed is:

1. A rotary engine, comprising:

a cylinder having a gas inlet and a gas outlet;

two rotors which are mounted inside the cylinder and rotatable freely, the rotors comprising a first rotor and a second rotor;

pistons fixed on the rotors, at least one pair of pistons being fixed to the first rotor, and at least one pair of pistons being fixed to the second rotor;

an ignition device provided on an inner wall of the cylinder;

a planetary conical gear differential located outside the cylinder, the planetary conical gear differential comprising a first sun gear and a second sun gear, wherein the first rotor and the second rotor are superposed concentrically, the first rotor is connected to the first sun gear through a spindle, the second rotor is connected to the second sun gear through a hollow shaft, the spindle passes through the hollow shaft, the first rotor and the second rotor are connected to the planetary conical gear differential on a same side of the planetary conical gear differential, the pistons are each provided with an independent combustion chamber thereon, and an opening of the combustion chamber faces the inner wall of the cylinder.

* * * * *